United States Patent
Jin et al.

(10) Patent No.: US 9,328,659 B2
(45) Date of Patent: May 3, 2016

(54) DISTRIBUTED COMBINED COOLING, HEATING AND POWER GENERATING APPARATUS AND METHOD WITH INTERNAL COMBUSTION ENGINE BY COMBINING SOLAR ENERGY AND ALTERNATIVE FUEL

(71) Applicant: INSTITUTE OF ENGINEERING THERMOPHYSICS, CHINESE ACADEMY OF SCIENCES, Beijing (CN)

(72) Inventors: Hongguang Jin, Beijing (CN); Hui Hong, Beijing (CN); Qibin Liu, Beijing (CN); Wei Han, Beijing (CN); Jun Sui, Beijing (CN)

(73) Assignee: INSTITUTE OF ENGINEERING THERMOPHYSICS, CHINESE ACADEMY OF SCIENCES, Beijing (CN)

( * ) Notice: Subject to any disclaimer, the term of this patent is extended or adjusted under 35 U.S.C. 154(b) by 283 days.

(21) Appl. No.: 14/345,505

(22) PCT Filed: Nov. 13, 2012

(86) PCT No.: PCT/CN2012/084528
§ 371 (c)(1),
(2) Date: Mar. 18, 2014

(87) PCT Pub. No.: WO2014/075221
PCT Pub. Date: May 22, 2014

(65) Prior Publication Data
US 2014/0338331 A1 Nov. 20, 2014

(51) Int. Cl.
*F01K 23/10* (2006.01)
*F03G 6/00* (2006.01)
*F02B 43/08* (2006.01)
*F02B 73/00* (2006.01)
(Continued)

(52) U.S. Cl.
CPC ............... *F02B 73/00* (2013.01); *F01D 13/00* (2013.01); *F03G 6/00* (2013.01); *F03G 6/06* (2013.01);
(Continued)

(58) Field of Classification Search
CPC ............. F02B 73/00; F03G 6/00; F03G 6/06; F01D 13/00; F25B 27/002; F25B 15/06; F25B 27/02; Y02E 10/46; Y02B 30/625
USPC ........... 60/614, 616, 618, 641.8, 641.15, 676, 60/698; 123/1 A, 2, 3
See application file for complete search history.

(56) References Cited

U.S. PATENT DOCUMENTS 8,042,336 B2 * 10/2011 Ustun ........................ F02C 6/14
60/413
8,397,504 B2 * 3/2013 Guzman ................. F01K 15/02
60/616

(Continued)

*Primary Examiner* — Hoang Nguyen
(74) *Attorney, Agent, or Firm* — Posz Law Group, PLC (57) ABSTRACT

The present invention provides a distributed combined cooling, heating and power generating apparatus with an internal combustion engine by combining solar energy and alternative fuel and a method thereof, the apparatus comprising: an energy storage system for combined reaction between solar energy and alternative fuel, a solar fuel internal combustion engine generating system, a lithium bromide refrigeration system for absorbing exhaust heat of flue gas of solar fuel, a reaction device for recovering exhaust heat of flue gas, a heat exchanger for recovering exhaust heat of exhaust gas and a cylinder jacket and water plate heat exchanger. According to the present invention, solar energy is combined with alternative fuel to achieve conversion of solar energy to fuel chemical energy, such that solar energy is stored in form of synthesis gas fuel and combined with the combined cooling, heating and power generating system, which possesses high energy storing intensity, includes small volume of storing device, and achieve the objects of cooling, heating and power combination in low cost and high efficiency, thereby effectively solving the problem of difficulty in storage, and high cost and low efficiency in usage.

21 Claims, 2 Drawing Sheets

(51) Int. Cl.
*F03G 6/06* (2006.01)
*F25B 15/06* (2006.01)
*F25B 27/02* (2006.01)
*F25B 27/00* (2006.01)
*F01D 13/00* (2006.01)

(52) U.S. Cl.
CPC ............... *F25B 15/06* (2013.01); *F25B 27/002* (2013.01); *F25B 27/02* (2013.01); *Y02B 30/625* (2013.01); *Y02E 10/46* (2013.01)

(56) References Cited

U.S. PATENT DOCUMENTS

| | | | | |
|---|---|---|---|---|
| 8,628,025 | B2* | 1/2014 | Bucknell | F01N 5/02 123/41.21 |
| 2013/0101908 | A1* | 4/2013 | McAlister | H01M 8/0491 429/411 |
| 2013/0213256 | A1* | 8/2013 | McAlister | B01J 12/007 105/62.1 |

* cited by examiner

DISTRIBUTED COMBINED COOLING, HEATING AND POWER GENERATING APPARATUS AND METHOD WITH INTERNAL COMBUSTION ENGINE BY COMBINING SOLAR ENERGY AND ALTERNATIVE FUEL

CROSS REFERENCE TO RELATED APPLICATION

This application is a U.S. national stage application of International Application No. PCT/CN2012/084528 filed on Nov. 13, 2012.

FIELD OF THE INVENTION

The present invention relates to fields of multiple energy sources combination and new energy source and energy saving and discharge reducing technology, and, more particularly to a distributed combined cooling, heating and power generating apparatus and method with internal combustion engine by combining solar energy and alternative fuel.

BACKGROUND

Solar electricity generation, refrigeration and heat supply is important approaches for reaching the target that the ratio of non-fossil energy to total primary consumed energy is about 15%. However, due to low power density and discontinuity of solar energy and difficulty for its storage, utilization ratio of solar energy is low, and thus development thereof is seriously limited. In particular, as for electricity generation from solar energy, no matter what type device for using solar energy, such as, trough-type or tank-type, is used, implement of unstable high heat flux density absorber and rather low temperature of working medium for generation result in bottlenecks of low generating efficiency and high cost, etc. Thus, the application scale of solar energy electricity generation is very limited. In addition, there is conflict between the unstability and discontinuity of the solar energy supply and relative stable requirements of heating and cooling, when solar energy is individually used in a heating or cooling application.

Combining solar energy and other energy, particularly solar energy and fossil energy, is a main approach to solve the problem of low usage efficiency and discontinuity of solar energy. Currently, it is internationally that the technologies of combining solar energy and fossil fuel are mostly directed to burn fossil fuel directly when required temperature could not be obtained from solar energy or no solar energy would be obtained. This type of technology of simply combining heat collection from solar energy and direct combustion of fossil fuel is widely used in heat supplying system, refrigeration system and power generating system for solar energy. However, this current technology does not consider and involve mating and cooperating solar energy and fossil energy during combining these different energies, but simply uses them together.

A combined cooling, heating and power generating system with an internal combustion engine as a power core is considered as a distributed energy system with a good market and implement prospect. With respect to a fuel gas turbine, an internal combustion engine not only is related to low-cost devices, but also possesses good partly-loading characteristic upon being operated in condition of low loading. However, a combined cooling, heating and power generating system with a gasoline or diesel internal combustion engine used as power core has a problem of serious pollutant discharge. In addition, exhaust heat of discharged smoke at high temperature (400° C.-600° C.) leads to a huge waste of exhaust heat during providing heat supplying in winter. Therefore, how to achieve high efficient and stable operation at various working conditions, i.e., how to ensure the power generation of the system to be constant at various working conditions and how to ensure the net power generated from of the solar energy to reach or approach a design value, while achieving sufficient and effective usage of solar energy, become an important technical problem to be urgently solved in technical field of solar energy and thermal power combination.

SUMMARY OF THE DISCLOSURE

The Technical Problem to be Solved

Accordingly, it is an object of the present invention to provide a distributed combined cooling, heating and power generating apparatus with an internal combustion engine by combining solar energy and alternative fuel and a method thereof, which may address the technical problems of storage difficulty, high cost and low efficiency for solar energy usage.

Technical Scheme

In order to achieve the above objects, a distributed combined cooling, heating and power generating apparatus with an internal combustion engine by combining solar energy with alternative fuel is provided, the apparatus comprising:

an energy storage system 100 for combined reaction between solar energy and alternative fuel, a solar fuel internal combustion engine generating system 200, a lithium bromide refrigeration system 300 for absorbing exhaust heat of flue gas of solar fuel, a reaction device 15 for recovering exhaust heat of flue gas, a heat exchanger 16 for recovering an exhaust heat of exhaust gas and a cylinder jacket and water plate heat exchanger 17, wherein, the energy storage system 100 for combined reaction between solar energy and alternative fuel is configured to use a trough-type optical collector 4 to concentrate solar radiation and project it to a tubular heat absorbing reactor 5 arranged along a focus line of the trough-type optical collector 4, so as to drive a decomposition or reform reaction of alternative fuel in the tubular heat absorbing reactor 5 to solar fuel;

the solar fuel internal combustion engine generating system 200 includes a fuel gas internal combustion engine 11 and a generator 12, in which the solar fuel produced by the energy storage system for reaction between solar energy and alternative fuel 100 is provided to directly drive the fuel gas internal combustion engine 11 for generating, and burning in cylinder of the fuel gas internal combustion engine 11, thereby releasing high-temperature heat, which is transformed to electrical energy by the generator 2;

the lithium bromide refrigeration system 300 for absorbing exhaust heat of flue gas of solar fuel includes a flue gas heat exchanger 13 and a steam dual effect lithium bromide refrigeration unit 14, in which the exhaust heat of the flue gas generated from burning of the solar fuel in the internal combustion engine 11 is used to generate steam through the flue gas heat exchanger 13 and to drive the steam dual effect lithium bromide refrigeration unit 14 for refrigerating, and outputted;

the reaction device 15 for recovering exhaust heat of flue gas is configured such that, both the flue gas discharged by the internal combustion engine 11 and the alternative fuel preheated by the preheating evaporator 3, in case the solar energy irradiation is insufficient or it is overcast or rain, are passed to the reaction device 15 for recovering exhaust heat of flue gas, in which exhaust heat of the flue gas is provided as reaction heat for conversion of the alternative fuel to hydrogen-rich fuel, so as to make alternative fuel completely be transformed into hydrogen-rich fuel and passed to the internal combustion engine 11, and the exhaust heat of the remaining flue gas are respectively passed to the flue gas heat exchanger 13 and the heat exchanger 16 for recovering exhaust heat of exhaust gas;

the heat exchanger 16 for recovering exhaust heat of exhaust gas is configured such that the steam generated by the flue gas heat exchanger 13 and the flue gas transferred from the reaction device 15 for recovering exhaust heat of flue gas pass through the heat exchanger 16 for recovering exhaust heat of exhaust gas to heat feedwater to produce domestic hot water;

the cylinder jacket and water plate heat exchanger 17 is configured such that the cylinder jacket water of the internal combustion engine 11 may heat feedwater by the cylinder jacket and water plate heat exchanger 17 to produce domestic hot water, which is also provided to the preheating evaporator 3.

In order to achieve the above objects, a distributed combined cooling, heating and power generating method with an internal combustion engine by combining solar energy and alternative fuel is also provided, which is applied to the apparatus, the method comprising:

providing an energy storage system 100 for combined reaction between solar energy and alternative fuel including a trough-type optical collector 4 and converging and projecting a solar light by the trough-type optical collector 4 to a tubular heat absorbing reactor 5 arranged along the focus line of the trough-type optical collector 4, so as to drive decomposition or reform of the alternative fuel in the tubular heat absorbing reactor 5 to solar fuel;

with the solar fuel generated from the energy storage system 100 for combined reaction between solar energy and alternative fuel, directly driving the internal combustion engine 11 in the solar fuel internal combustion engine generating system 200 for generating, wherein, the solar fuel is burnt in cylinder in the internal combustion engine 11 to release high-temperature heat, which then is transformed by the generator 12 in the solar fuel internal combustion engine generating system 200 as electricity to be outputted;

passing the flue gas and the exhaust heat thereof generated through combustion of the solar fuel in the internal combustion engine 11 through the flue gas heat exchanger 13 in the lithium bromide refrigeration system 300 for absorbing exhaust heat of flue gas of solar fuel, to generate steam and to drive the steam dual effect lithium bromide refrigeration unit 14 in the lithium bromide refrigeration system 300 for absorbing exhaust heat of flue gas of solar fuel for refrigeration, and to be outputted.

Advantage Effects

With the above technical scheme, the following advantages can be obtained by the present invention:

1. The present invention provides a distributed combined cooling, heating and power generating apparatus with an internal combustion engine by combining solar energy and alternative fuel, which is designed to combine solar energy and alternative fuel to achieve transformation of the solar energy to the chemical energy of fuel. The internal combustion engine employs burning of secondarily transformed alternative fuel, rather than direct burning of the original alternative fuel. The solar light energy is transformed and synthesized into the gas fuel to be stored in the gas fuel. It is coupled with the combined cooling, heating and power generating apparatus with the internal combustion engine, which is able not only to achieve high density of energy storage, miniaturization of energy storage device, and low-cost, high-efficient combined cooling, heating and power supplying of solar energy, but also to select the combined heating and power supplying or the combined cooling and power supplying of solar energy by adjusting amount of the flue gas burnt from the solar fuel according to cold or heat load requirements. That is, the apparatus according to the present invention is not implemented to generate electricity, supply cold and heat by individually using solar energy. Therefore, the present invention effectively solves the technical problems currently existed in solar energy storage and usage and high cost and low efficiency problems.

2. The distributed combined cooling, heating and power generating apparatus with an internal combustion engine by combining solar energy and alternative fuel according to the present invention has characteristics of small volume, high efficiency of comprehensive utilization of solar energy source and low costs. As for a combined cooling, heating and power generating apparatus with a trough-type solar energy absorbing reaction apparatus with a heat collecting area of 325 $m^2$ and a heat collecting power of 140 kW and an internal combustion engine with a nominal power of 380 kW, by assuming that running time of solar energy is 2500 h, irradiation intensity of solar energy is 600 $W/m^2$ and the price of the methanol fuel is 2000 CNY/ton, the combined cooling, heating and power generating apparatus will produce electrical quantity of up to 903 thousand kWh, cold quantity of up to 532 thousand kWh and heat quantity of up to 724 thousand kWh over one year, in which fractional energy savings of primary energy source is up to 30.2%, comprehensive utility efficiency of the apparatus for entire energy is up to 70~80%, and efficiency of net electricity generation of solar energy is up to 25-28%, much more than 10-17% for that of a apparatus with solar energy individually used. By assuming accounting cooling price as 0.45 CNY/kWh, heating price as 0.3 CNY/kWh and electricity price as 1.08 CNY/kWh, a distributed combined cooling, heating and power generating apparatus with an internal combustion engine by combining solar energy and alternative fuel with power capacity of 380 kW, which has a unit cost of device investment of about 5000 CNY/kW, has a capital recovery period of eight years, far lower than that of the existing solar energy heat generating device.

3. The distributed combined cooling, heating and power generating apparatus with an internal combustion engine by combining solar energy and alternative fuel according to the present invention can save solar field area of 24% compared to a single solar energy generating, solar energy heating or solar energy refrigerating technology, in which solar energy collecting efficiency of the present apparatus is conservatively estimated to be 50%, heat generating and refrigerating efficiency to be 70% and solar energy generating efficiency to be 15%. For same cold, electricity and/or heat output, the present apparatus can save 24% solar field area. That is, the space required for solar energy mirror field and investment may be reduced by 24%.

4. The distributed combined cooling, heating and power generating apparatus with an internal combustion engine by combining solar energy and alternative fuel according to the present invention can combine solar energy and alternative fuel and achieve high efficient and quality usage of medium- and-low-temperature solar energy through an internal combustion engine, overcome the technical bottle neck of high cost and low efficiency for solar energy individually generating, refrigerating and heating, possess characteristics of miniaturization, flexibility, decentralization, economy and low contamination. It even may be implemented in regions of wilderness, frontier sentry and backland for small scale electricity supply refrigeration and heat supplying, thus produce huge economy and society values.

REFERENCE NUMBER LIST 100 energy storage system for combined reaction between solar energy and alternative fuel;
1 material tank,
2 material feeding pump,
3 preheating evaporator,
4 trough-type optical collector,
5 tubular heat absorbing reactor,
6 condenser,
7 gas-liquid separating device.
8 gas compressor,
9 gas storage tank,
10 circulating pump
200 solar fuel internal combustion engine generating system
11 internal combustion engine,
12 generator;
300 lithium bromide refrigeration system for absorbing exhaust heat of flue gas of solar fuel
13 flue gas heat exchanger,
14 steam dual effect lithium bromide refrigeration unit;
15 reaction device for recovering exhaust heat of flue gas;
16 heat exchanger for recovering exhaust heat of exhaust gas;
17 cylinder jacket and water plate heat exchanger.

DETAILED DESCRIPTION OF THE PREFERRED EMBODIMENT

In order to further convey to those skilled in the art the purposes, technical schemes and advantages of the present invention, detailed description is made in conjunction with embodiments by reference to adjunctive drawing.

The core principle of the present invention resides in, firstly, combining the integrated solar energy and alternative heat energy transformed from alternative fuel in place of traditional heat energy storage for solar energy; secondly, integrating the combination of solar energy and alternative fuel with an internal combustion engine generating system, an absorption type refrigeration system and an heat supplying and hot water system, which may simultaneously provide heating, cooling and electrical energy for users, achieving high-effective and low-cost usage of solar energy at medium and low temperature.

Firstly, according to the present invention, the collected solar energy at temperature from 150° C. to 300° C. is transformed into chemical energy in form of high quality secondary hydrogen-rich fuel, such as, $H_2$, $CO_2$, CO, by way of reforming or cracking alternative fuel by a combined tubular heat absorption reactor. Then, solar fuel is supplied to a miniature or intermediate internal combustion engine for burning via a compressor and a gas storage tank, which drives a generating set for generating, thereby achieving high effective thermal electricity generation from solar energy at medium and low temperature. In summer, high-temperature exhaust heat of flue gas from combustion of solar fuel is passed through the exhaust heat boiler and the exhaust heat absorbing lithium bromide refrigeration system to provide cooling energy for cold loading in summer, achieving usage of exhaust heat of solar fuel for cooling. The exhaust gas and cooling water for cylinder jacket are used for providing heat water loads. In winter, exhaust heat of cylinder jacket water and part of exhaust heat of exhaust gas are passed through the heat exchanger to provide hot water loads for heating and domestic hot water.

Figure 1:
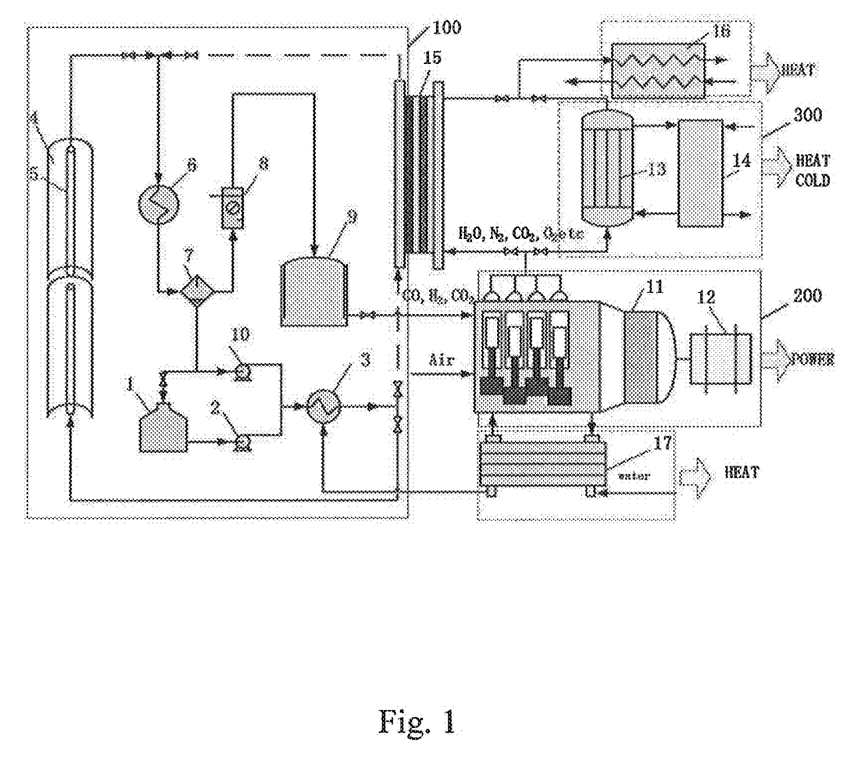
FIG. 1 is a schematic structural view of a distributed combined cooling, heating and power generating apparatus with an internal combustion engine by combining solar energy and alternative fuel with according to the present invention.

As illustrated in FIG. 1, a distributed combined cooling, heating and power generating apparatus with an internal combustion engine by combining solar energy and alternative fuel is provided according to the present invention, comprising an energy storage system 100 for combined reaction between solar energy and alternative fuel, a solar fuel internal combustion engine generating system 200, a lithium bromide refrigeration system 300 for absorbing exhaust heat of flue gas of solar fuel, a reaction device 15 for recovering exhaust heat of flue gas, a heat exchanger 16 for recovering exhaust heat of exhaust gas and a cylinder jacket and water plate heat exchanger 17.

The above components are connected as below: the energy storage system 100 for combined reaction between solar energy and alternative fuel is connected to the solar fuel internal combustion engine generating system 200, the reaction device 15 for recovering the exhaust heat of flue gas and the cylinder jacket and water plate heat exchanger 17, respectively, via conduits. The solar fuel internal combustion engine generating system 200 is, in turn, connected to the energy storage system 100 for combined reaction between solar energy and alternative fuel, the lithium bromide refrigeration system 300 for absorbing exhaust heat of flue gas of solar fuel, the reaction device 15 for recovering exhaust heat of flue gas and the cylinder jacket and water plate heat exchanger 17, respectively, via conduits. The lithium bromide refrigeration system 300 for absorbing exhaust heat of flue gas of solar fuel is connected via conduits to the solar fuel internal combustion engine generating system 200, the reaction device 15 for recovering the exhaust heat of flue gas and the heat exchanger 16 for recovering exhaust heat of exhaust gas. Valves are provided on each of the above conduits for control.

The energy storage system 100 for combined reaction between solar energy and alternative fuel includes a material tank 1, a material feeding pump 2, a preheating evaporator 3, a trough-type optical collector 4, a tubular heat absorbing reactor 5, a condenser 6, a gas-liquid separating device 7, a gas compressor 8, a gas storage tank 9 and a circulating pump 10. In the energy storage system 100 for reaction between solar energy and alternative fuel according to the present invention, a trough-type optical collector 4 is provided to concentrate and project the solar energy containing light to the tubular heat absorbing reactor 5 arranged along the focus line of the trough-type optical collector 4, so as to drive decomposition or reform of the alternative fuel in the tubular heat absorbing reactor 5 into solar fuel, in which the alternative fuel may be, such as, methanol and/or dimethyl ether, etc., and is transformable via solar energy thermal chemical reaction into solar fuel, such as, $H_2$, $CO_2$, CO, and is then stored. Specifically, the solar light is concentrated by the trough-type optical collector 4 and projected to the tubular heat absorbing reactor 5 arranged along the focus line of the trough-type optical collector 4. The alternative fuel in the material tank 1, after mixed, is supplied to the preheating evaporator 3 by the material feeding pump 2 to be preheated, vaporized and overheated, so as to be formed into the material vapor and then supplied to the tubular heat absorbing reactor 5, in which the material vapor is decomposed or reformed by absorbing solar energy at temperature of 150° C. to 300° C. Products exiting from the tubular heat absorbing reactor 5 include $H_2$, $CO_2$, CO and un-reacted products, which are passed into the condenser 6 to be cooled. The resulting gas-liquid mixture is supplied to the gas-liquid separating device 7 to perform a gas-liquid separation. Fuel generated in the gas-liquid separating device 7 is passed through the gas compressor 8 into the solar fuel gas storage tank 9.

The solar fuel internal combustion engine generating system 200 includes a fuel gas internal combustion engine 11 and a generator 12. In the solar fuel internal combustion engine generating system 200, the solar fuel generated from the energy storage system for combined reaction between solar energy and alternative fuel 100 is mixed with the air input from external, in the air mixer and the gas compressor, and then passed into the internal combustion engine 11, in which they are burnt to release high-temperature energy and generate high-temperature flue gas. The generated high-temperature flue gas contains $H_2O$, $N_2$, $O_2$ and a little of $CO_2$, and is supplied to the generating set 12 for generating, thereby achieving electricity power output. It is solar fuel that is burnt in the internal combustion engine 11. The discharged flue gas are passed to the reaction device 15 for recovering exhaust heat of flue gas.

The lithium bromide refrigeration system 300 for absorbing exhaust heat of flue gas of solar fuel includes a flue gas heat exchanger 13 and a steam dual effect lithium bromide refrigeration unit 14. The lithium bromide refrigeration system 300 for absorbing exhaust heat of flue gas of solar fuel is configured, such that the flue gas discharged by the internal combustion engine 11 is transformed by the flue gas heat exchanger 13 into steam, which is used to drive the steam dual effect lithium bromide refrigeration unit 14 to perform refrigeration in summer, achieving cooling purpose of the exhaust heat of exhaust smoke of the internal combustion engine, and is also used by the heat exchanger 16 for recovering exhaust heat of exhaust gas to heat water, so as to obtain domestic hot water in winter, achieving heating purpose of the exhaust heat of exhaust smoke of the internal combustion engine.

The cylinder jacket and water plate heat exchanger 17 is configured to receive the cylinder jacket water from the internal combustion engine 11 and, by using it, to heat the supplied water to generate domestic hot water, which is also in turn provided to the preheating evaporator 3 to meet energy demand of preheating and evaporating fuel.

The reaction device 15 for recovering exhaust heat of flue gas and the energy storage system 100 for combined reaction between solar energy and alternative fuel are in parallel arranged. When solar energy is insufficient or it is overcast or rain, the reaction device 15 for recovering exhaust heat of flue gas is started up while the alternative fuel preheated by the preheating evaporator 3 and the flue gas discharged by the internal combustion engine 11 are both supplied to the exhaust heat of flue gas recovering reaction device 15, in which exhaust heat of the flue gas is used for reaction heat for conversion of alternative fuel to hydrogen-rich fuel, such that all alternative fuel is transformed into hydrogen-rich fuel and then passed to the internal combustion engine 11. The exhaust heat of the remained flue gas is provided to the flue gas heat exchanger 13 or the heat exchanger 16 for recovering exhaust heat of exhaust gas, such that steam is generated in the flue gas heat exchanger 13 to drive the steam dual effect lithium bromide refrigeration unit 14 to perform refrigeration in summer, or domestic hot water is produced in the heat exchanger 16 for recovering exhaust heat of exhaust gas in winter. In the exhaust heat of flue gas recovering reaction device 15, the methanol may be transformed to synthesis gas, so as to ensure fuel supply during operation of the internal combustion engine.

The flue gas discharged by the internal combustion engine 11 and, case solar energy is insufficient or it is overcast or rain, the alternative fuel preheated by the preheating evaporator 3 are both supplied to the reaction device 15 for recovering exhaust heat of flue gas, in which exhaust heat of the flue gas is used for reaction heat for conversion of alternative fuel to hydrogen-rich fuel, such that all alternative fuel is transformed into hydrogen-rich fuel and then passed to the internal combustion engine 11. The exhaust heat of the remained flue gas is provided to the flue gas heat exchanger 13 and the heat exchanger 16 for recovering exhaust heat of exhaust gas, respectively.

In the reaction device 15 for recovering exhaust heat of flue gas, the exhaust heat of the flue gas is used as reaction heat required for transforming the methanol to hydrogen-rich fuel, such that all alternative fuel is transformed, ensuring only hydrogen-rich fuel is burnt in the internal combustion engine 11, instead of alternative fuel directly.

The steam produced in the flue gas heat exchanger 13 and flue gas from the reaction device 15 for recovering the exhaust heat of flue gas are supplied to the heat exchanger 16 for recovering exhaust heat of exhaust gas to heat water, thereby obtaining domestic hot water.

The distributed combined cooling, heating and power generating apparatus with an internal combustion engine by combining solar energy and alternative fuel according to the present invention may be operated in various manners by a control system at various loading and situations, and achieve high effective electricity generation, refrigeration and heat supply for solar energy at low and intermediate temperatures.

Combined reaction of solar energy and the alternative fuel may achieve function of energy storage without configuration of a heat storage device. In case solar energy is sufficient, solar energy is provided to preheat and evaporate methanol fuel, while, in overcast situation and winter, exhaust heat from the exhaust gas and cylinder jacket water cooling water are provided instead. The reaction process of the alternative fuel passing material circulation driven by solar energy is not a single passing process of material. Alternatively, a fuel gas tank may be provided to store excessive synthesis gas generated in situation that solar energy irradiation exceeds a design irradiation intensity.

The distributed combined cooling, heating and power generating apparatus with an internal combustion engine by combining solar energy and alternative fuel with according to the present invention may be operated to supply not only heating and power, but also power and cooling by adjusting amount of steam produced by the flue gas heat exchanger 13. When no cold and heat loading exists, the refrigeration subsystem and heat supplying subsystem may be decoupled by the control device and only the solar energy and alternative fuel combined internal combustion engine is driven to generate power.

In the energy storage system 100 for combined reaction between solar energy and alternative fuel, the tubular heat absorbing reactor 5 is configured to operate in two modes, including single passing reaction mode and material circulating reaction mode. It is control strategy that both the single passing reaction mode and material circulating reaction mode may be adopted by closing a material circulating pump 10 according to solar energy irradiation, under maximizing ratio of the solar energy to total used energy and maximizing material flow rate. When the solar irradiation intensity is strong enough to reach temperature for sufficient reaction of alternative fuel, the circulating pump 10 is closed such that the single passing reaction mode is adopted. The products outputted by the tubular heat absorbing reactor 5 include $H_2$, CO, $CO_2$ and non-reacted material. These products are passed to the condenser 6 to be cooled and the resultant gas-liquid mixture is then transmitted to the gas-liquid separating device 7 to perform a gas-liquid separation. The resultant fuel is then provided to the solar fuel gas storage tank 9 via the gas compressor 8. When the solar irradiation intensity cannot ensure complete conversion of the material at maximum flow rate, the circulating pump 10 is started up such that the material circulation mode is adopted and part of material is reacted. The unreacted material is transferred from the gas-liquid separating device 7 to the material tank 1 and mixed with the alternative fuel therein, and then the mixture is pumped to the preheating evaporator 3 by the material feeding pump 2 to be preheated, evaporated and overheated, and then the resultant material vapor is transferred to the tubular heat absorbing reactor 5 for circulating.

The reacted products outputted from the tubular heat absorbing reactor 5 mainly include $H_2$, CO, $CO_2$ and unreacted methanol fuel. The reacted products are cooled by the condenser 6 and separated by the gas-liquid separating device 7, such that the solar fuel including $H_2$, CO, $CO_2$ as main components are compressed and supplied to the gas storage tank 9. At the same time, the unreacted products are transferred to the material tank 1 and to be passed through the material feeding pump 2, the preheating evaporator 3 and the tubular heat absorbing reactor 5 for circulating.

The output conduit of the gas storage tank 9 of the energy storage system for reaction between solar energy and alternative fuel 100 is connected to the input conduit of the internal combustion engine 11. The solar fuel is burnt in cylinder of the internal combustion engine 11, which releases high-temperature heat and drives the internal combustion engine, thus generating electrical energy. It is solar fuel that is burnt in the internal combustion engine 11. That is, solar energy is used to drive reformation or thermal decomposition of the alternative fuel, causing components to be changed, thus generating secondary fuel with increased heating value to be burnt.

The processes of preheating and evaporating methanol fuel are provided with energy by solar energy. In overcast and winter, exhaust heat of the cooling water of cylinder jacket and water plate heat exchanger 17 is supplied for the above processes.

Figure 2:
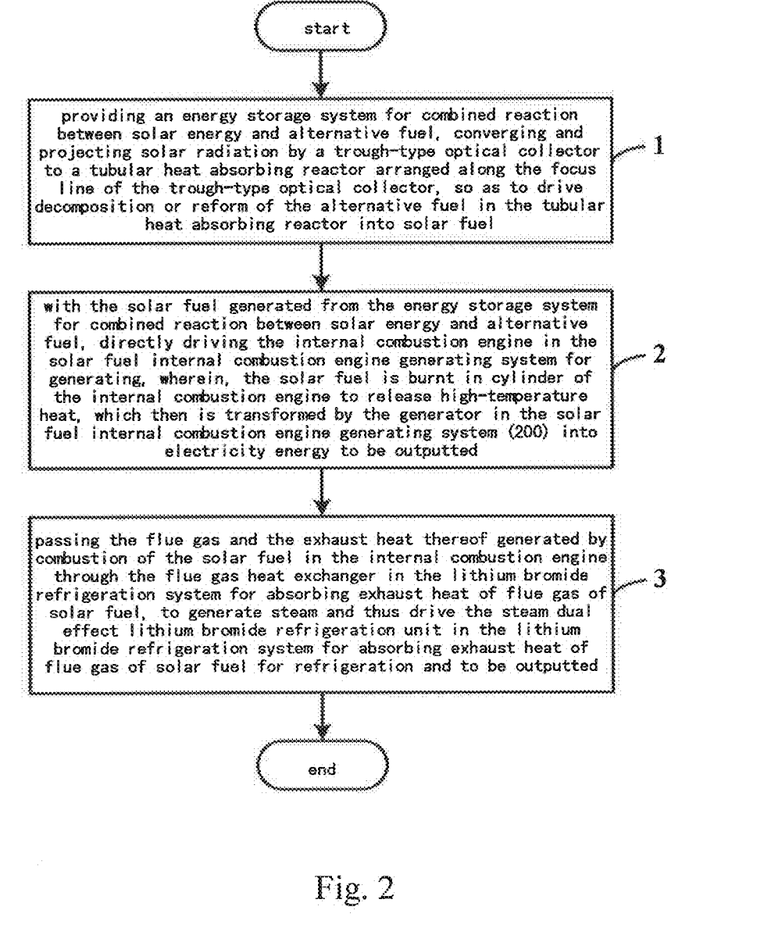
FIG. 2 is a flow chart of a distributed combined cooling, heating and power generating method with an internal combustion engine by combining solar energy and alternative fuel according to the present invention.

Based on the apparatus in FIG. 1, a flow chart of the distributed combined cooling, heating and power generating method with an internal combustion engine by combining a solar energy and alternative fuel is illustrated in FIG. 2.

The method comprises:

Step 1: an energy storage system 100 for combined reaction between solar energy and alternative fuel is provided to include a trough-type optical collector 4 to concentrate and project solar radiation to a tubular heat absorbing reactor 5 arranged along the focus line of the trough-type optical collector 4, so as to drive decomposition or reform of the alternative fuel in the tubular heat absorbing reactor 5 into solar fuel;

Step 2: the solar fuel generated from the energy storage system 100 for combined reaction between solar energy and alternative fuel is provided to directly drive the internal combustion engine 11 in the solar fuel internal combustion engine generating system 200 for generating, wherein, the solar fuel is burnt in cylinder of the internal combustion engine 11 to release high-temperature heat, which then is transformed by the generator 12 in the solar fuel internal combustion engine generating system 200 for electricity to be outputted;

Step 3: the flue gas and the exhaust heat thereof generated by combustion of the solar fuel in the internal combustion engine 11 are passed through the flue gas heat exchanger 13 in lithium bromide refrigeration system 300 for absorbing the exhaust heat of flue gas of solar fuel, to generate steam and drive the steam dual effect lithium bromide refrigeration unit 14 in the lithium bromide refrigeration system 300 for absorbing exhaust heat of flue gas of solar fuel for refrigeration.

In step 1, the energy storage system 100 for combined reaction between solar energy and alternative fuel includes a material tank 1, a material feeding pump 2, a preheating evaporator 3, a trough-type optical collector 4, a tubular heat absorbing reactor 5, a condenser 6, a gas-liquid separating device 7, a gas compressor 8 and a gas storage tank 9, wherein, the solar energy is concentrated via the trough-type optical collector 4 and projected to the tubular heat absorbing reactor 5 arranged along the focus line of the trough-type optical collector 4; the alternative fuel in the material tank 1, after being mixed, is transferred to the preheating evaporator 3 by the material feeding pump 2 to be preheated, evaporated and overheated. The resultant material vapor is passed to the tubular heat absorbing reactor 5, in which it absorbs solar energy at temperature ranged from 150° C. to 300° C. and subjected to decomposition and reform reaction. The products outputted from the tubular heat absorbing reactor 5 include $H_2$, CO, $CO_2$ and unreacted material, and are transferred to the condenser 6 to be cooled so as to produce a gas-liquid mixture, and then is transferred to the gas-liquid separating device 7 for a gas-liquid separation. The produced fuel by the gas-liquid separating device 7 is passed via the gas compressor 8 to the solar fuel gas storage tank 9.

Further, the energy storage system 100 for combined reaction between solar energy and alternative fuel includes a circulating pump 10 connected between the gas-liquid separating device 7 and the material tank 1. When solar energy density is not enough to ensure complete conversion of material at maximum flow rate, the circulating pump 10 is opened and thus the material circulating mode is adopted and part of material is reacted. The unreacted material is passed from the gas-liquid separating device 7 to the material tank 1 and mixed with the alternative fuel therein, and then is transferred via the material feeding pump 2 to the preheating evaporator 3 to be preheated, evaporated and overheated. The produced material vapor is passed to the tubular heat absorbing reactor 5 for circulating. When the solar energy intensity is strong enough to reach temperature required for complete reaction of alternative fuel, the circulating pump 10 is closed and the mode of single passing conversion is adopted. The reactants outputted from the tubular heat absorbing reactor 5 include $H_2$, CO, $CO_2$ and unreacted material and are transferred to the condenser 6 to be cooled so as to produce a gas-liquid mixture, and then the gas-liquid mixture is transferred to the gas-liquid separating device 7 for gas-liquid separation. The produced fuel by the gas-liquid separating device 7 is passed to the solar fuel gas storage tank 9.

According to the method illustrated in FIG. 2, in case solar energy irradiation is insufficient or it is overcast or rain, the reaction device 15 for recovering exhaust heat of flue gas is started and the alternative fuel preheated by the preheating evaporator 3 and the flue gas discharged from the internal combustion engine 11 are both transferred to the reaction device 15 for recovering exhaust heat of flue gas, in which the exhaust heat of the flue gas is provided for reaction heat for conversion of alternative fuel to hydrogen-rich fuel, such that the alternative fuel is completely transformed to hydrogen-rich fuel and then transferred to the internal combustion engine 11. The exhaust heat of the remained flue gas is inputted to the flue gas heat exchanger 13 and the heat exchanger 16 for recovering exhaust heat of exhaust gas, respectively. In the flue gas heat exchanger 13, the exhaust heat of the flue gas is used for generating steam and to drive the steam dual effect lithium bromide refrigeration unit 14 to perform refrigeration. In the heat exchanger for recovering exhaust heat of exhaust gas, the exhaust heat of the flue gas is used to heat feedwater to generate domestic hot water. In the reaction device 15 for recovering exhaust heat of flue gas, the exhaust heat of the flue gas discharged by the internal combustion engine 11 is provided for reaction heat for conversion of the alternative fuel to the hydrogen-rich fuel, such that the alternative fuel is completely transformed, so as to ensure the fuel introduced and burnt in the internal combustion engine 11 is hydrogen-rich fuel, rather than the alternative fuel.

The flue gas discharged by the internal combustion engine 11 together with, in case the solar energy irradiation is insufficient or it is overcast or rain, the alternative fuel preheated by the preheating evaporator 3 is transferred to the reaction device 15 for recovering exhaust heat of flue gas, in which the exhaust heat of the flue gas is provided for reaction heat for conversion of alternative fuel to hydrogen-rich fuel, such that the alternative fuel is completely transformed to hydrogen-rich fuel and then transferred to the internal combustion engine 11. The exhaust heat of the remained flue gas is inputted to the flue gas heat exchanger 13 and the heat exchanger 16 for recovering exhaust heat of exhaust gas, respectively. The cylinder jacket water of the internal combustion engine 11 is passed through the cylinder jacket and water plate heat exchanger 17 to heat feedwater to produce domestic hot water. The produced domestic hot water is provided to the preheating evaporator 3. The steam generated in the flue gas heat exchanger 13 and the flue gas from the reaction device 15 for recovering exhaust heat of flue gas are provided to the heat exchanger 16 for recovering exhaust heat of exhaust gas for heating feed water to obtain domestic hot water.

An example is provided for illustration. At region of outstation in the west, there are demands of electricity, heat supplying, domestic hot water and refrigeration. The average irradiation intensity of solar energy during available period in this region is about 400 W/m². The average total electrical load over a year is 110 kW, the average domestic hot water load is 70 kW, refrigeration load is 100 kW (during refrigeration season) and heating load is 80 kW (during heat supplying season).

The distributed combined cooling, heating and power generating apparatus with an internal combustion engine by combining solar energy and alternative fuel according to the present invention may be adopted and set up according to the above-required loads. The main apparatuses and parameters thereof for the schemes according to the present invention are illustrated as below stable 1.

Stable 1 Main Apparatuses and Parameters Thereof

| Apparatus | Amount | Parameters |
| --- | --- | --- |
| Energy storage system for combined reaction between solar energy and alternative fuels | 1 | Solar energy collected area: 150 m² <br> The designed heat collecting efficiency: 64% <br> The designed heat collecting amount: 69 kW |
| Solar fuel internal combustion engine generating system | 3 | Generating power: 116 kW for each <br> Generating efficiency: 35% <br> Temperature of exhaust smoke: 515° C. |
| Exhaust heat boiler (reaction device for recovering exhaust heat of flue gas) | 1 | Amount of produced steam: 0.11 t/h <br> Steam pressure: 0.5 MPa |
| Lithium bromide refrigeration system for absorbing exhaust heat of flue gas of solar fuel | 1 | Refrigeration power: 110 kW <br> Temperature of refrigeration water: 7/12° C. |
| Heat exchanger for recovering exhaust heat of exhaust gas | 1 | Heat exchange power: 11.6 kW |
| Cylinder jacket and water plate heat exchanger | 1 | Heat exchange power: 61 kW |
| Gas storage tank | 1 | Volume: 8000 m³ (5 MPa) |

In the example, amount of net generating electricity from solar energy is 1.16 kW, and that of refrigeration is 110 kW. Total operation time for full loading over one year is 8760 hour, amount of supplying electricity over one year is one million kWh, that of refrigeration is 320 thousand kWh, that of heat supplying is 240 thousand kWh and that of hot water supply is 520 thousand kWh, and consumed methanol is accounted 650 tons. The capital for the above system may be recovered in seven years.

If a separate system burning methanol is adopted, i.e., to consume electricity from network source, and to provide a methanol boiler to heat domestic hot water, based on an efficiency of 30.4% of the network source (by considering loss of network source of 8%) and an efficiency of 85% of a methanol high-temperature water boiler, the separate system will totally consume 800 tons of methanol to obtain same throughout as the present combined system. By comparison, it is known that the fractional energy saving of the distributed combined cooling, heating and power generating system with an internal combustion engine by combining solar energy and alternative fuel according to the present invention is up to 23%.

If 20% of exhaust heat of the flue gas is used to decompose methanol during summer refrigeration season and winter heating season, it is amounted that one million kWh electrical output, 260 thousand kWh refrigeration output, 190 thousand kWh heat supplying, 500 thousand kWh hot water supplying will be obtained over one year, and 650 ton methanol will be consumed. The capital of the system can be recovered in 8 years.

If a separate system burning methanol is adopted, i.e., to consume electricity from network source, and to provide a methanol boiler to heat domestic hot water, based on an efficiency of 30.4% of the network source (by considering loss of network source of 8%) and an efficiency of 85% of a methanol high-temperature water boiler, the separate systems will totally consume 789 tons of methanol to obtain same throughout as the present combined system. By comparison, it is known that the fractional energy saving of the distributed combined cooling, heating and power generating system with an internal combustion engine by combining solar energy and alternative fuel according to the present invention is up to 20.2%.

The above specific embodiments are provided to further illustrate the objects, technical schemes and advantages of the present inventions. It is understood that the above illustration should be specific embodiments, instead of limiting to the present invention, any changes and modifications to the

The invention claimed is:

1. A distributed combined cooling, heating and power generating apparatus with an internal combustion engine by combining solar energy and alternative fuel, comprising:

an energy storage system for combined reaction between solar energy and alternative fuel, a solar fuel internal combustion engine generating system, a lithium bromide refrigeration system for absorbing exhaust heat of flue gas of solar fuel, a reaction device for recovering exhaust heat of flue gas, a heat exchanger for recovering exhaust heat of exhaust gas and a cylinder jacket and water plate heat exchanger, wherein the energy storage system for combined reaction between solar energy and alternative fuel is configured to use a trough-type optical collector to concentrate and project solar radiation to a tubular heat absorbing reactor arranged along a focus line of the trough-type optical collector, so as to drive a decomposition or reform reaction of alternative fuel in the tubular heat absorbing reactor into solar fuel;

the solar fuel internal combustion engine generating system includes a fuel gas internal combustion engine and a generator, in which the solar fuel produced by the energy storage system for combined reaction between solar energy and alternative fuel is provided to directly drive the fuel gas internal combustion engine for generating power, burnt in cylinder of the fuel gas internal combustion engine, thereby releasing high-temperature heat, and transformed to electrical energy through transformation process via the generator to be outputted;

the lithium bromide refrigeration system for absorbing exhaust heat of flue gas of solar fuel includes a flue gas heat exchanger and a steam dual effect lithium bromide refrigeration unit, in which the exhaust heat of the flue gas generated from the solar fuel burning in the internal combustion engine is used for generating steam through the flue gas heat exchanger and driving the steam dual effect lithium bromide refrigeration unit to refrigerate and to be outputted;

the reaction device for recovering exhaust heat of flue gas is configured such that, both the flue gas discharged by the internal combustion engine and the alternative fuel preheated by the preheating evaporator, in case the solar energy irradiation is insufficient or it is overcast or rain, are passed to the reaction device for recovering exhaust heat of flue gas, in which exhaust heat of the flue gas is provided as reaction heat for conversion of the alternative fuel to hydrogen-rich fuel, so as to make alternative fuel completely be transformed to hydrogen-rich fuel and passed to the internal combustion engine, and the remaining flue gas are respectively passed to the flue gas heat exchanger and the heat exchanger for recovering exhaust heat of exhaust gas;

the heat exchanger for recovering exhaust heat of exhaust gas is configured such that the steam generated by the flue gas heat exchanger and the flue gas transferred from the reaction device for recovering exhaust heat of flue gas are used to heat feedwater to produce domestic hot water; and the cylinder jacket and water plate heat exchanger is configured such that the cylinder jacket water of the internal combustion engine is used to heat feedwater through the cylinder jacket and water plate heat exchanger to produce domestic hot water, which is also provided to the preheating evaporator.

2. The distributed combined cooling, heating and power generating apparatus according to claim 1, wherein the energy storage system for combined reaction between solar energy and alternative fuel comprises a material tank, a material feeding pump, a preheating evaporator, a trough-type optical collector, a tubular heat absorbing reactor, a condenser, a gas-liquid separating device, a gas compressor and a gas storage tank;

the solar energy is concentrated and projected by the trough-type optical collector to the tubular heat absorbing reactor arranged along the focus line of the trough-type optical collector;

the alternative fuel in the material tank, after being mixed, is transferred to the preheating evaporator by the material feeding pump to be preheated, evaporated and overheated, and the resultant material vapor is passed to the tubular heat absorbing reactor, in which it absorbs solar energy at temperature range from 150° C. to 300° C. and is subject to decomposition or reformation reaction;

the reacted products outputted from the tubular heat absorbing reactor include $H_2$, $CO$, $CO_2$ and non-reacted material, and they are passed to the condenser to be cooled and the cooled gas-liquid mixture is then transmitted to the gas-liquid separating device to perform a gas-liquid separation, the resultant fuel from the gas-liquid separating device is then provided to the solar fuel gas storage tank via the gas compressor.

3. The distributed combined cooling, heating and power generating apparatus according to claim 2, wherein the energy storage system for combined reaction between solar energy and alternative fuel further includes a circulating pump connected between the gas-liquid separating device and the material tank, which is configured such that, when solar energy intensity is not strong enough to ensure complete conversion of reactant material at maximum flow rate, the circulating pump is opened and thus the mode of reactant material circulating is adopted and part of material is reacted, such that the unreacted material is passed from the gas-liquid separating device to the material tank and mixed with the alternative fuel therein, and then the mixture is transferred via the material feeding pump to the preheating evaporator to be preheated, evaporated and overheated, and the resultant material vapor is passed to the tubular heat absorbing reactor for circulating.

4. The distributed combined cooling, heating and power generating apparatus according to claim 3, wherein when the solar energy intensity is strong enough to reach temperature for complete reaction of alternative fuel, the circulating pump is closed and the mode of single passing transformation is adopted, such that the reactants outputted from the tubular heat absorbing reactor including $H_2$, $CO$, $CO_2$ and unreacted material are transferred to the condenser to be cooled so as to produce a gas-liquid mixture, and then the mixture is transferred to the gas-liquid separating device for gas-liquid separation, and the fuel produced by the gas-liquid separating device is passed to the solar fuel gas storage tank via the gas compressor.

5. The distributed combined cooling, heating and power generating apparatus according to claim 1, wherein the alternative fuel includes methanol and dimethyl ether, which are transformable to solar fuel including $H_2$, $CO_2$ and CO via thermal chemical decomposition or reform reaction and stored directly.

6. The distributed combined cooling, heating and power generating apparatus according to claim 1, wherein the solar fuel internal combustion engine generating system is configured such that the solar fuel generated by the energy storage system for combined reaction between solar energy and alternative fuel and air from the external are passed to the internal combustion engine via the air mixer and the gas compressor to be burnt, so as to release high-temperature heat and flue gas, which is used by the generating set for generating, achieving electricity energy output.

7. The distributed combined cooling, heating and power generating apparatus according to claim 6, wherein the high-temperature and flue gas include $H_2O$, $N_2$, $O_2$ and a little of $CO_2$.

8. The distributed combined cooling, heating and power generating apparatus according to claim 6, wherein it is solar fuel that is burnt in the internal combustion engine, and the discharged flue gas is passed to the reaction device for recovering exhaust heat of flue gas.

9. The distributed combined cooling, heating and power generating apparatus according to claim 1, wherein the lithium bromide refrigeration system for absorbing exhaust heat of flue gas of solar fuel is configured such that the flue gas discharged by the internal combustion engine are transformed to steam by the flue gas heat exchanger, which is usable to drive the steam dual effect lithium bromide refrigeration unit to perform refrigeration in summer refrigerating season, achieving refrigeration application of the flue gas discharged by the internal combustion engine, and the flue gas discharged by the internal combustion engine are also usable by the heat exchanger for recovering exhaust heat of exhaust gas in winter heating season to heat feedwater to produce domestic hot water, achieving heating application of the flue gas discharged by the internal combustion engine.

10. The distributed combined cooling, heating and power generating apparatus according to claim 1, wherein the cylinder jacket water in the internal combustion engine is used by the cylinder jacket and water plate heat exchanger to heat feedwater to produce domestic hot water, which is also provided to the preheating evaporator, meeting heat energy demand of the preheating and evaporating of fuel.

11. The distributed combined cooling, heating and power generating apparatus according to claim 1, wherein the reaction device for recovering exhaust heat of flue gas and the energy storage system for combined reaction between solar energy and alternative fuel are configured in parallel, such that, when the solar energy irradiation is not sufficient or it is overcast or rain, the reaction device for recovering exhaust heat of flue gas is started up, the alternative fuel preheated by the preheating evaporator and the flue gas discharged by the internal combustion engine are both passed to the reaction device for recovering exhaust heat of flue gas, in which the exhaust heat of the flue gas provide the reaction heat required for conversion of the alternative fuel to hydrogen-rich fuel, and the alternative fuel is thereby completely transformed to hydrogen-rich fuel and then passed to the internal combustion engine; the remaining flue gas are respectively passed to the flue gas heat exchanger and the heat exchanger for recovering exhaust heat of exhaust gas, wherein, steam is generated in the flue gas heat exchanger to drive the steam dual effect lithium bromide refrigeration unit to perform refrigeration in summer refrigeration season, and the heat exchanger for recovering exhaust heat of exhaust gas is configured to heat feedwater to produce domestic hot water.

12. The distributed combined cooling, heating and power generating apparatus according to claim 11, wherein the reaction device for recovering exhaust heat of flue gas is configured such that the exhaust heat of the flue gas discharged by the internal combustion engine provides the reaction heat required for conversion of the alternative fuel to hydrogen-rich fuel to make complete conversion of the alternative fuel, ensuring the fuel introduced and burnt in the internal combustion engine to be hydrogen-rich fuel, rather than alternative fuel.

13. A distributed combined cooling, heating and power generating method with an internal combustion engine by combining a solar energy and alternative fuel, which is implemented by the apparatus according to claim 1, comprising:

providing an energy storage system for combined reaction between solar energy and alternative fuel, converging and projecting solar radiation by a trough-type optical collector to a tubular heat absorbing reactor arranged along the focus line of the trough-type optical collector, so as to drive decomposition or reform of the alternative fuel in the tubular heat absorbing reactor into solar fuel;

with the solar fuel generated from the energy storage system for combined reaction between solar energy and alternative fuel, directly driving the internal combustion engine in the solar fuel internal combustion engine generating system for generating, wherein, the solar fuel is burnt in cylinder of the internal combustion engine to release high-temperature heat, which then is transformed by the generator in the solar fuel internal combustion engine generating system into electricity energy to be outputted; and passing the flue gas and the exhaust heat thereof generated by combustion of the solar fuel in the internal combustion engine through the flue gas heat exchanger in the lithium bromide refrigeration system for absorbing exhaust heat of flue gas of solar fuel, to generate steam and thus drive the steam dual effect lithium bromide refrigeration unit in the lithium bromide refrigeration system for absorbing exhaust heat of flue gas of solar fuel for refrigeration and to be outputted.

14. The distributed combined cooling, heating and power generating method according to claim 13, wherein the energy storage system for combined reaction between solar energy and alternative fuel comprises a material tank, a material feeding pump, a preheating evaporator, a trough-type optical collector, a tubular heat absorbing reactor, a condenser, a gas-liquid separating device, a gas compressor and a gas storage tank, wherein, the solar energy is concentrated and projected by the trough-type optical collector to the tubular heat absorbing reactor arranged along the focus line of the trough-type optical collector;

the alternative fuel in the material tank, after being mixed, is transferred to the preheating evaporator by the material feeding pump to be preheated, evaporated and overheated, and the resultant material vapor is passed to the tubular heat absorbing reactor, in which it absorbs solar energy at temperature range from 150° C. to 300° C. and is subject to decomposition or reformation reaction; and the reacted products outputted from the tubular heat absorbing reactor include $H_2$, CO, $CO_2$ and non-reacted material, and are passed to the condenser to be cooled and the cooled gas-liquid mixture is then transmitted to the gas-liquid separating device to perform a gas-liquid separation, the fuel produced from the gas-liquid separating device is then provided to the solar fuel gas storage tank via the gas compressor.

15. The distributed combined cooling, heating and power generating method according to claim 14, wherein the energy storage system for combined reaction between solar energy and alternative fuel further includes a circulating pump connected between the gas-liquid separating device and the material tank, the circulating pump being configured such that, when solar energy intensity is not strong enough to ensure complete transformation of material at maximum flow rate, the circulating pump is opened and thus the mode of material circulating is adopted and part of material is reacted, such that the unreacted material is passed from the gas-liquid separating device to the material tank and mixed with the alternative fuel therein, and then the mixture is transferred via the material feeding pump to the preheating evaporator to be preheated, evaporated and overheated, and the resultant material vapor is passed to the tubular heat absorbing reactor for circulating.

16. The distributed combined cooling, heating and power generating method according to claim 15, wherein when the solar energy intensity is strong enough to reach temperature for complete reaction of alternative fuel, the circulating pump is closed and the mode of single passing transformation is adopted, such that the reactants including $H_2$, CO, $CO_2$ outputted from the tubular heat absorbing reactor and unreacted material are both transferred to the condenser to be cooled so as to produce a gas-liquid mixture, and then the mixture is transferred to the gas-liquid separating device for gas-liquid separation, and the fuel produced by the gas-liquid separating device is passed to the solar fuel gas storage tank via the gas compressor.

17. The distributed combined cooling, heating and power generating method according to claim 13, wherein when the solar energy irradiation is not sufficient or it is overcast or rain, the reaction device for recovering exhaust heat of flue gas is started up, such that, the alternative fuel preheated by the preheating evaporator and the flue gas discharged by the internal combustion engine are both passed to the reaction device for recovering exhaust heat of flue gas, in which the exhaust heat of the flue gas provides the reaction heat required for conversion of the alternative fuel to hydrogen-rich fuel, and the alternative fuel is thereby completely transformed to hydrogen-rich fuel and then passed to the internal combustion engine; the remaining flue gas are respectively passed to the flue gas heat exchanger and the heat exchanger for recovering exhaust heat of exhaust gas, wherein, steam is generated in the flue gas heat exchanger to drive the steam dual effect lithium bromide refrigeration unit to perform refrigeration in summer refrigeration season, and the heat exchanger for recovering exhaust heat of exhaust gas is configured to heat feedwater to produce domestic hot water.

18. The distributed combined cooling, heating and power generating method according to claim 17, wherein the reaction device for recovering exhaust heat of flue gas is configured such that the exhaust heat of the flue gas discharged by the internal combustion engine is provided as the reaction heat of conversion of the alternative fuel to hydrogen-rich fuel to make complete conversion of the alternative fuel, ensuring the fuel introduced and burnt in the internal combustion engine to be hydrogen-rich fuel, rather than alternative fuel.

19. The distributed combined cooling, heating and power generating method according to claim 13, wherein the flue gas discharged by the internal combustion engine and the alternative fuel preheated by the preheating evaporator, if the solar energy irradiation is not sufficient or it is overcast or rain, are both passed to the reaction device for recovering exhaust heat of flue gas, in which the exhaust heat of the flue gas provides the reaction heat of conversion of the alternative fuel to hydrogen-rich fuel, such that the alternative fuel is thereby completely transformed to hydrogen-rich fuel and then passed to the internal combustion engine; the remaining flue gas are respectively passed to the flue gas heat exchanger and the heat exchanger for recovering exhaust heat of exhaust gas.

20. The distributed combined cooling, heating and power generating method according to claim 19, wherein the cylinder jacket water of the internal combustion engine is passed through the cylinder jacket and water plate heat exchanger to heat feedwater to produce domestic hot water, which is also provided to the preheating evaporator.

21. The distributed combined cooling, heating and power generating method according to claim 19, wherein the steam generated by the flue gas heat exchanger and the flue gas from the reaction device recovering exhaust heat of flue gas are passed through the heat exchanger for recovering exhaust heat of exhaust gas so as to heat feedwater to produce domestic hot water.

* * * * *